Jan. 12, 1960 A. M. MARKS 2,921,129

METHOD AND SCREEN FOR PRODUCING TELEVISION IMAGES

Original Filed Nov. 23, 1948 6 Sheets-Sheet 1

INVENTOR.

Alvar M. Marks

BY Albert F. Kronman

ATTORNEY

INVENTOR.
Alvin M. Marks
BY Albert F. Kronman
ATTORNEY

Jan. 12, 1960 A. M. MARKS 2,921,129

METHOD AND SCREEN FOR PRODUCING TELEVISION IMAGES

Original Filed Nov. 23, 1948 6 Sheets-Sheet 3

INVENTOR.

Alvin M. Marks

BY Albert F. Kronman

ATTORNEY

Jan. 12, 1960 A. M. MARKS 2,921,129

METHOD AND SCREEN FOR PRODUCING TELEVISION IMAGES

Original Filed Nov. 23, 1948 6 Sheets-Sheet 4

INVENTOR.

Alvin M. Marks

BY Albert F. Kronman

ATTORNEY

INVENTOR.
Alvin M. Marks
BY Albert F. Kronman
ATTORNEY

Jan. 12, 1960 A. M. MARKS 2,921,129

METHOD AND SCREEN FOR PRODUCING TELEVISION IMAGES

Original Filed Nov. 23, 1948 6 Sheets-Sheet 6

INVENTOR.

Alvin M. Marks

BY Albert F. Kronman

ATTORNEY

United States Patent Office 2,921,129 Patented Jan. 12, 1960

2,921,129

METHOD AND SCREEN FOR PRODUCING TELEVISION IMAGES

Alvin M. Marks, Beechhurst, N.Y.

Original application November 23, 1948, Serial No. 61,697, now Patent No. 2,670,402, dated February 23, 1954. Divided and this application January 14, 1954, Serial No. 404,027

14 Claims. (Cl. 178—7.3)

This invention relates to a novel type of two-dimensional viewing screen for the display of television or motion pictures, and is a division of an application for patent entitled "Method and Screen for Producing Television Images," Serial No. 61,697, filed November 23, 1948, now U.S. Patent No. 2,670,402, dated February 23, 1954.

Presently known two-dimensional viewing screens for television systems employ the well known cathode ray tube either as a projection image source or as a direct view screen. However, these tubes have many undesirable characteristics. Among the difficulties experienced with the cathode ray tube are: the added depth required behind the viewing screen surface for each small increase in the size of said screen; the limited amount of light intensity produced by the tube; the distortion to the image resulting from the curved surface of the tube, and the limited operating life of said tube.

Accordingly, it is an object of this invention to provide a two-dimensional viewing screen for the display of television or motion pictures, which will be free of the limitations found in presently known devices.

Another object of the invention is to produce a screen which is self-luminous, relatively thin, and which may be made without limitations as to size of viewing area.

A further object of this invention is to scan the screen in one or more dimensions by means of a "dissipationless lumped-constant line."

An object of this invention is to scan in one or more dimensions by means of a plurality of cavities, which respond to microwave excitation means.

A feature of this invention is its novel microwave multi-resonator tube, based on the klystron principle, which is used as a scanning means.

Another feature of this invention is the provision of a scanning means comprising a wave guide into which is piped a variable frequency microwave.

The invention consists of the construction, combination, arrangement of parts, and the steps of the method, as herein illustrated, described and claimed.

In the accompanying drawings, forming part hereof, are illustrated several forms of embodiment of the invention, in which drawings similar reference characters designate corresponding parts, and in which.

One of the preferred embodiments of the present invention in its broad aspects, consists of a screen having a sheet of light polarizing material in front and in back thereof, said polarizers being crossed so as to substantially extinguish light impinging upon the rear polarizer; a light source located behind the rearmost polarizer, and means within the screen and associated therewith whereby selected portions thereof may be activated to rotate the plane of polarization of the light after it leaves the rear polarizer, thereby enabling said light to traverse the front polarizer and be viewed. Means are also provided for scanning the screen so that the transmitted light will paint a picture upon the screen. Since it is necessary to modulate the intensity of the light coming through the screen, in order to create the said picture, light intensity modulation means are also provided.

The first embodiment of this invention employs the parallel electro-optic effect, obtained with certain crystals such as ammonium dihydrogen phosphate crystals, also known as "PN crystals." These crystals have the property of introducing a linear change in the refractive indices with the strength of the applied electric field which causes a corresponding rotation of the plane of polarization of the light passing through the crystal.

Figures 1, 2, 3, 4, 5:
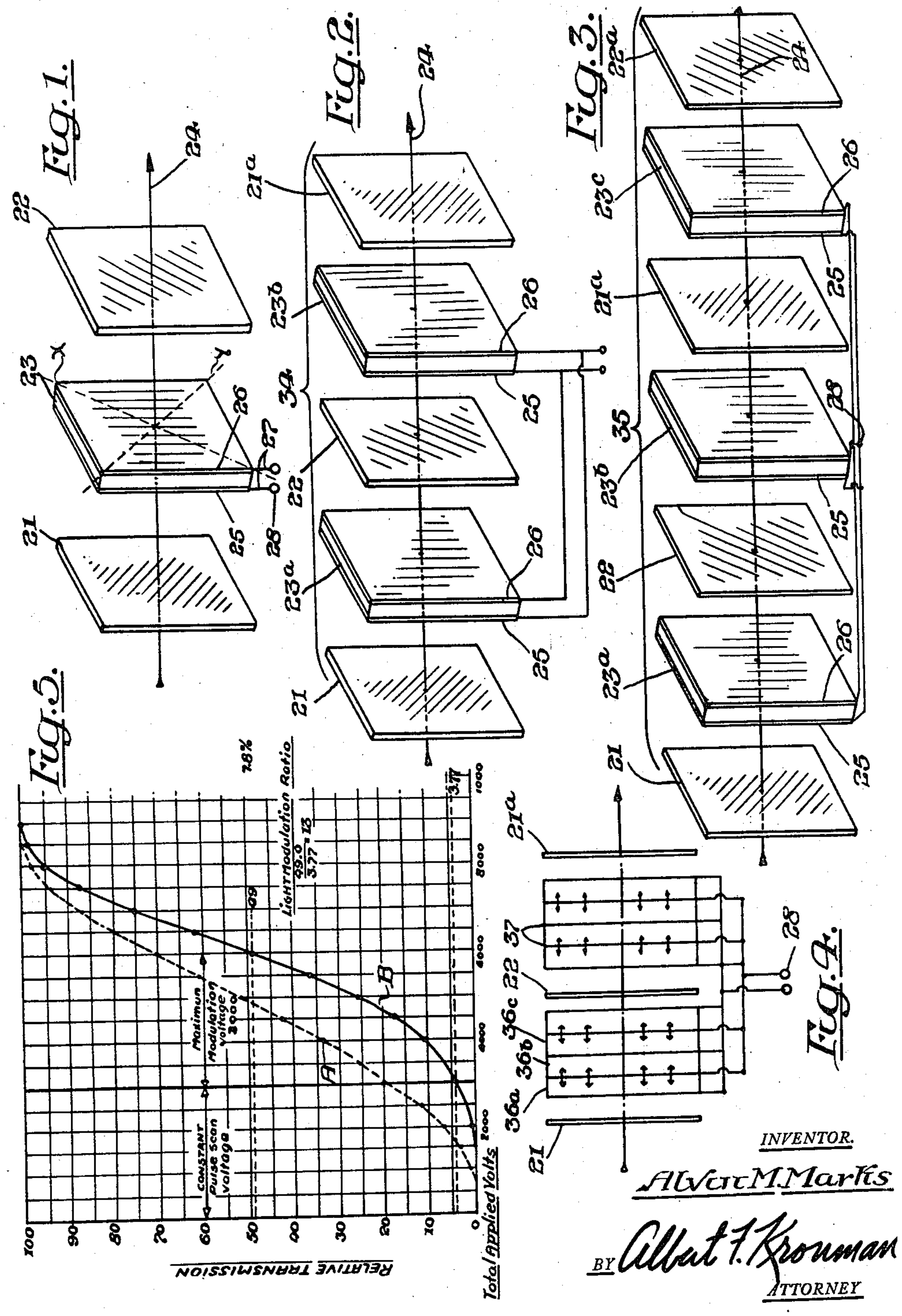
Figure 1 is a somewhat exploded view in perspective of a conventional electro-optic shutter employing the parallel electro-optic effect.
Figure 2 is a somewhat exploded view in perspective of a two-section electro-optic shutter according to this invention, to achieve, under certain conditions of operation, a greater ratio between the maximum and minimum light transmission possible with the shutter shown in Figure 1.
Figure 3 is a somewhat exploded view in perspective of a three-section electro-optic shutter which comprises a modification of the structure shown in Figure 2.
Figure 4 is a somewhat diagrammatic vertical section of a modification of the two-section shutter whereby lower operating voltages may be employed.
Figure 5 is a graphical representation, showing the operating characteristics of the two-section shutter, shown in Figure 2 as a solid line, and the characteristics of the single shutter, shown in Figure 1, as a dashed line.

Referring to the drawings, and particularly to Figure 1, there are shown two polarizing sheets 21, 22, having polarizing axes at right angles to each other, coinciding with the shading lines thereon. A transparent PN or other suitable plate 23 is interposed between the polarizers 21, 22. Said plate 23 has its Z or optical axis coincident with a beam of light 24 directed at the plate 23 and normal thereto. The Y axis of the crystal plate 23 is parallel to the polarizing axis of the sheet 21. Transparent electrodes 25, 26 are mounted upon the faces of the crystal 23. Conductors 27 are attached to the electrodes 25, 26, said conductors 27 ending in the terminals 28.

Since the polarizing axes of the sheets 21, 22 are at right angles to each other, light 24 directed at the rear of sheet 21 will not be able to pass through sheet 22. However, if an electric field be applied to the faces of the crystal plate 23, the light from the first sheet 21, upon entering the plate 23 will be caused to rotate its plane of polarization, thus allowing passage of light through the second sheet 22, which will then become visible.

Figure 6:
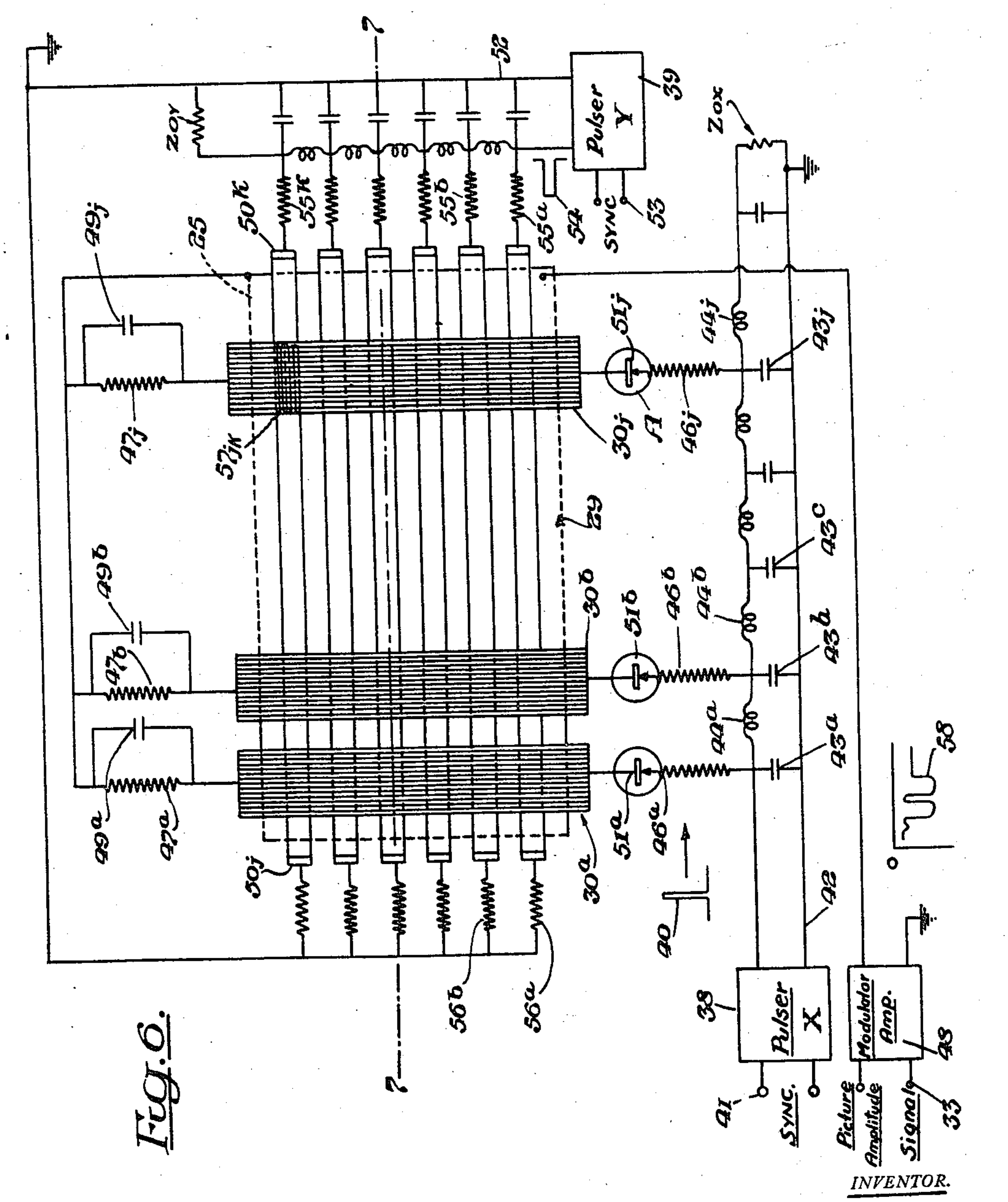
Figure 6 is a somewhat schematic view taken in front elevation, of a two-dimensional screen and its associated circuits constructed in accordance with this invention.
Figures 7, 11, 12, 13, 14, 15:
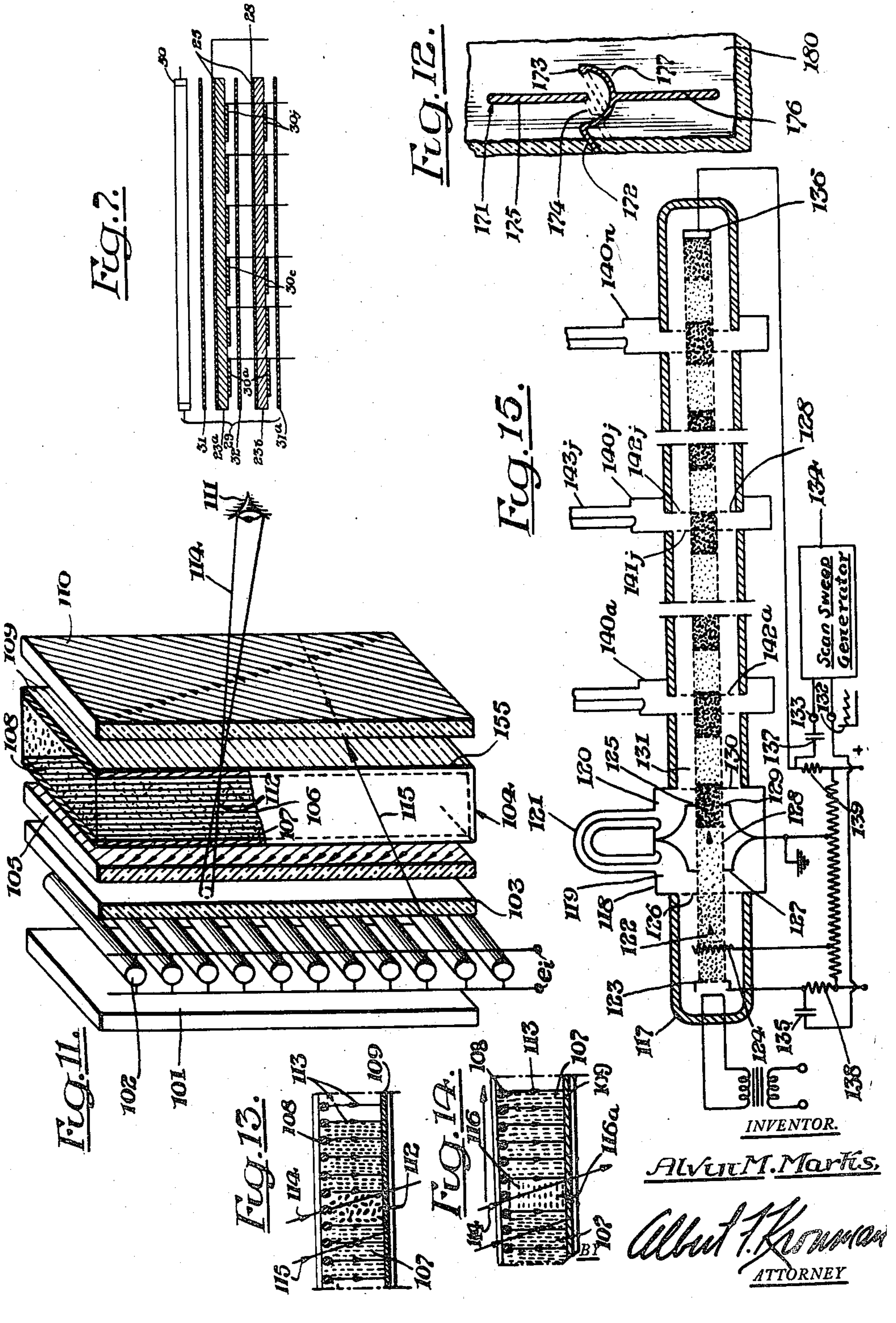
Figure 7 is a horizontal section through the screen, taken on line 7—7 of Figure 6.
Figure 11 is a diagrammatic view in perspective of another embodiment of the present invention.
Figure 12 is a novel dipole terminating a three wire microwave transmission line as applied to the screen shown in Figure 17.
Figure 13 is a fragmentary view of a portion of the screen showing the disorientation of dipole particles.
Figure 14 is a fragmentary view of a portion of the screen showing the realignment of the dipole particles.
Figure 15 is a sectional view along the axis of a frequency scanning tube, according to this invention.

In the complete embodiment of the invention shown in Figures 6 and 7, crystal plate 23 has been enlarged to include the entire area of the screen 29 either as a single crystal or a mosaic of crystals. One of the electrodes 25 may also be coextensive with the enlarged crystal plate. The other electrode 26, however, now appears as a series of parallel strips 30*a*, 30*b*, 30*c*—30*j*, etc. These strips have been greatly enlarged in the drawing for the sake of clarity. Large polarizers 31, 32 are placed behind and in front of the screen 29, respectively. The polarizers are co-extensive in size with the crystal area and have their axes of polarization crossed. Thus, if a voltage is applied (between the crossed polarizing plates 31, 32) between the strip 30*j* and the rear electrode 25, only light impinging upon the screen at that portion of its area between the strip 30*j* and the rear electrode 25 will pass through the front polarizer 32 and become visible.

In order to employ the above described action for the purposes of this invention, it is necessary to successively activate the strips 30*a*, 30*b*, etc. so as to scan the entire area of the screen 29. It is further required that the light transmission of each point of the screen be modulated by the impressed picture signal and correlated with the scanning means. Electronic means for performing these operations are hereinafter set forth. The number of strips 30 should correspond to the number of lines to be scanned in the particular screen.

The scanning and modulating system employed in conjunction with the invention will be referred to as "pulse scanning and modulating." In this system a picture amplitude modulated signal 33 is impressed across all of the horizontal or vertical conducting elements of the screen 29, while a traveling electric pulse activates the conducting elements successively. The means by which this is brought about will be explained more fully in connection with Figure 6.

The response characteristics of the two-section shutter 34 shown in Figure 2 is shown as curve B in Figure 5. As may be seen from an examination of this curve, a voltage of approximately 3000 volts is required to reach the knee of the response characteristics curve. Until this voltage is reached practically no light will be transmitted through the shutter 34. If a modulation voltage be applied to the shutter 34 in addition to the initial voltage, up to a total modulation voltage of 3000 volts, a substantial light output may be produced. This modulation voltage is applied simultaneously to all the vertical screen conductive elements. The modulation voltage must not exceed the pulse scan voltage. The maximum modulation voltage should equal the constant pulse scan voltage. A modulation ratio of approximately 13 to 1 is obtainable with a two-section shutter with the values of voltage chosen and graphically illustrated in Figure 5. By modulation ratio is meant the ratio of maximum light intensity with maximum applied modulation voltage to the minimum light intensity when zero modulation voltage is applied, as indicated on Figure 5.

The response characteristic curve A of a single section shutter is also shown upon the graph in Figure 5. The single shutter curve rises more gradually than that of the two-section shutter. For this reason the modulation ratio is limited to approximately 5 to 1 in the single section shutter. This ratio may be insufficient for satisfactory contrast ratio of light and dark areas on the screen. The three-section shutter 35, shown in Figure 3, on the other hand, is capable of producing modulation ratio of the order of 30 or more.

In Figure 4 there is shown a further modification of the two-section shutter 34, shown in Figure 2. This construction comprises a plurality of crystal plates 36*a*, 36*b*, 36*c*, etc., respectively, interleaved with transparent electrodes 37 connected as shown. This construction is similar to that of a pile condenser in which the condenser plates comprise the transparent electrodes 37 which are interleaved with the crystal plates 36*a*, 36*b*, 36*c*, etc. By reversing the direction of the electric field within adjacent crystal plates, as indicated by the arrows, it is possible to obtain a much lower operating voltage than that required in Figure 2. Thus, for example, with the four crystal plates per section shown in Figure 4 in place of the single crystal plate per section 23*a*, 23*b*, shown in Figure 2, the operating voltage is ¼ that shown in Figure 2, i.e., the device shown in Figure 4 will operate on a pulse scan voltage of 750 volts, and a modulation voltage running between 0 and 750 volts.

Referring again to Figures 6 and 7, 38 and 39 indicates horizontal (X) and vertical (Y) pulsers respectively. The operating requirements of these pulsers 38, 39 are periodically to produce a rectangular pulse, having an amplitude of the order of 3000 volts and a duration of approximately 1/10 to 2/10 micro-seconds. Pulsers such as are herein described are well known in the electronics art, having been used extensively in connected with radar devices. However, the present pulsers may be constructed to produce comparatively low powered pulses.

Referring to the (X) pulser 38, a pulse 40 is emitted at the commencement of each (X) scanning cycle. The pulser 38 is periodically keyed to effect this result by the application of the horizontal television synchronization signals across terminals 41.

In order to cause the pulse 40 to scan the screen in a horizontal direction, i.e., along the (X) scanning direction of the screen, there is provided a delay line 42. This delay line 42 comprises a dissipationless, lumped constant line, which is terminated in the characteristic resistance of the line $Z_{0X}$. Such a line is shown in Figure 6 as being constructed from a plurality of capacitors 43*a*, 43*b*, 43*c*, etc., and inductor elements 44*a*, 44*b*, 44*c*, etc. The *j*th element of the delay line 42 is the capacitor 43*j* and the inductor 44*j*. The pulse 40 travels down the delay line 42 with a constant velocity which is dependent upon the value of the inductors and capacitors 43 comprising the lumped constants.

The confines of the screen 29 are shown in dashed lines in Figure 6 as within the area defined by the transparent electrode 25, to which the signal voltage 58 is applied, said voltage having a negative amplitude. Between the electrode 25 and the vertical conducting strips, 30*a*, 30*b*, . . . 30*j*, etc., there is positioned an electro-optic responsive shutter 23, such as is shown in Figures 1–4. If the shutter arrangement shown in Figure 2 is employed, the requisite pulse amplitude is approximately 3000 volts. If the arrangement shown in Figure 4 is used the pulse amplitude may be a fraction of this, as for example, 750 volts.

In operation, the voltage pulse 40, having arrived at the *j* element, is applied between the resistor 46*j* connecting though the strip 30*j* to the resistor 47*j* to the common transparent electrode 25. The common electrode 25 is connected to the picture signal amplifier 48 which applies a negative amplitude 58 to the electrode 25. Thus the potential between the strip 30*j* and the common electrode 25 is the additive resultant voltage of the positive pulse and the negative picture signal. This potential appears as a potential difference across the electro-optic responsive element 23 between the said strip 30*j* and the common electrode 25. The capacitor 49*j* is rapidly charged to and retains this potential difference, said potential difference decaying at such a rate as to provide a persistence effect between successive scanning operations, hereinafter described.

The potential difference above referred to activates and opens the *j*th strip of the electro-optic shutter 23 which extends across the entire screen. However, since only strip *j* is subjected to the electrical voltage pulse at this particular instant, only this strip will be able to transmit light and this light will be transmitted in proportion to the signal amplitude.

The source of light of the screen shown in Figure 6 comprises a bank of fluorescent flash tubes 50. These tubes are flashed in succession by means of the traveling electric pulse produced by the Y scanning device 39. Since the duration of the light flash is on the order of 90 micro-seconds, the traveling light flash of the scanning beam will chiefly be utilized along one scanning dimension, thereby reducing the overall luminous power required.

The total intensity requirements for the source of light 50 may be considerably reduced by introducing the above referred to persistence effect to the particular voltage applied to the transparent electrode strip **30*j*. This persistence effect is accomplished by applying the voltage through a rectifier element 51*j* which may comprise any suitable rectifier element, such as a diode, a copper oxide rectifier, or a germanium type rectifier. In addition to the rectifier element 51*j*, a capacitor 49*j* is shunted across the resistor 47*j*. This capacitor 49*j* is also understood to include the capacitative effect of the strip 30*j* to common electrode 25. When the combined electric voltage pulse 40 plus the signal voltage 58** is applied to the *j*th circuit, the capacitor **49*j* is rapidly charged to a voltage proportional to the applied pulse, plus the picture signal voltage 58 in series with the applied pulse. When the pulse 40** has passed along beyond the *j*th terminal of the delay line 42, the capacitor **49*j* maintains the potential difference between element 30*j* and electrode 25; the said combined voltage decreasing at an exponential time rate, depending on the RC value of the resistor 47*j* and the capacitor 49*j* only. The rectifier 51*j* may be considered to have a substantially infinite resistance for the reverse potential difference across it after the passage of the pulse 40**.

Since the delay line 42 is composed of physically realizable components, and these have a certain amount of resistance which comprise various losses, there is a resultant decrease of the voltage amplitude of pulse 40 as the pulse travels from the pulser 38 to the end of the line which is terminated in its characteristic resistance *Zox*. Inasmuch as it is necessary for the elements **30*a*, 30*b*, 30*c*, . . . 30*j*, etc to be operated at a constant pulse voltage, the resistors 46*a*, 46*b*, . . . 46*j* are of decreasing value from the start of the line to the end, respectively. As a result, the high initial voltage of pulse 40 will then be attenuated to a considerably lower level upon the electrode strip 30*a* and will be attenuated somewhat less to the same level on electrode 30*j*, so that a constant voltage pulse will scan across the screen from 30*a* through 30*j***, etc.

Figure 8:
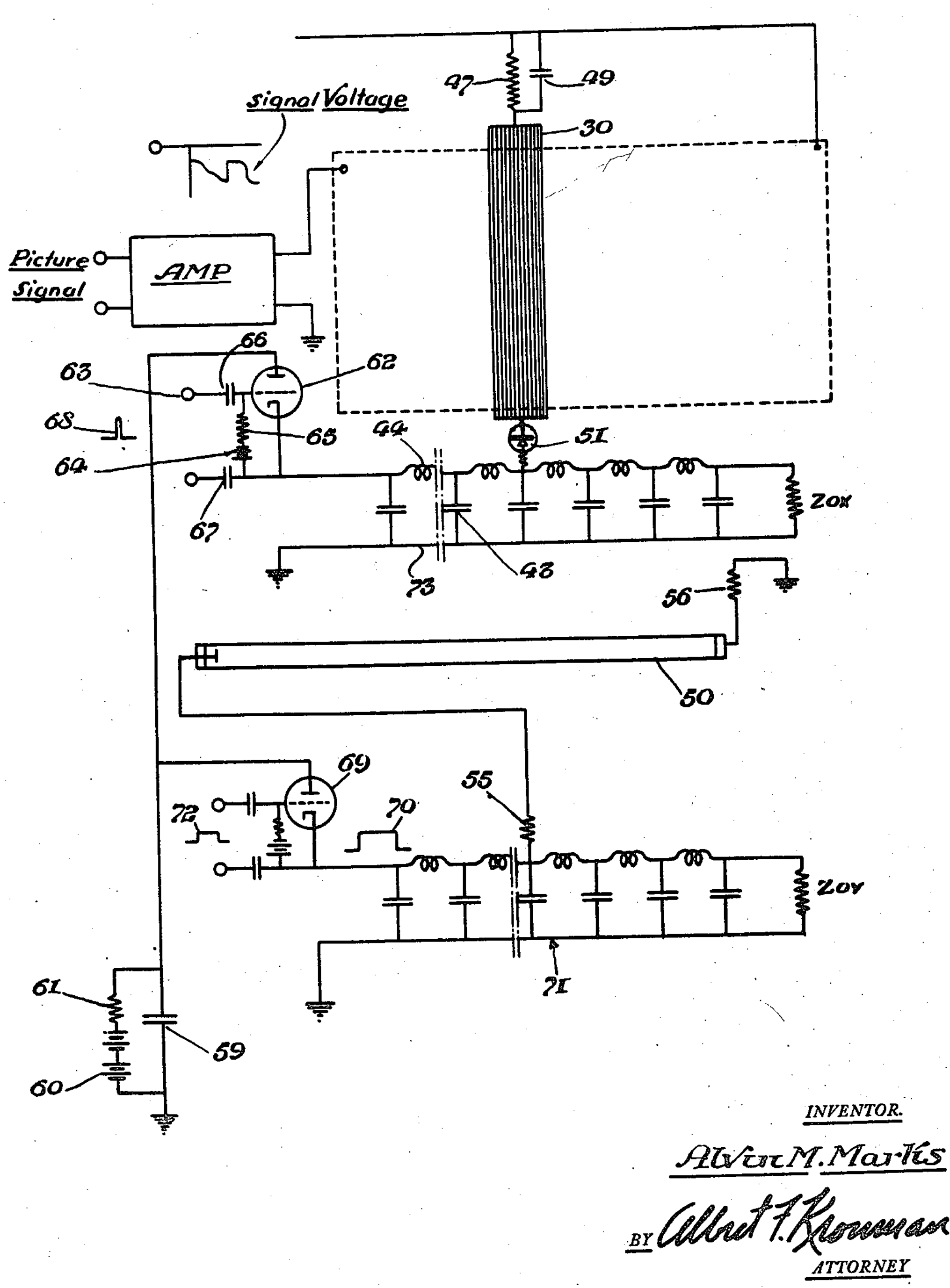
Figure 8 is a schematic view of a composite or single pulser unit for actuating the vertical and horizontal delay lines.

The prior description has dealt only with the X scan. The following will be directed toward the Y scanning line 52. While a separate pulser 39 is shown in Figure 6 for the Y scan, it will be understood that the X pulser 38 and the Y pulser may be combined into a single pulser unit by providing a suitable switching circuit interposed between the lines 42 and 52, so that the line 42 will be used for a succession of scanning pulses for the X scanning line during one frame, and then a single longer pulse will be switched to the line 52 to operate the Y scanning sequence at the commencement of each frame. This switching circuit is shown in Figure 8. The operation of said switching circuit may be controlled by the conventional horizontal and vertical television synchronizing signals.

As shown in Figure 6, the Y pulser 39 is operated from the vertical synchronization signal supplied to the terminal 53, and emits a long pulse 54 which travels down the line 52 to the terminal resistor *Zoy*. The time required for the pulse 54 to travel down the line 52 is exactly the time required for one frame, namely 1/30 of a second (or 1/60 of a second in interlaced scanning, not shown). In the particular modification of the invention shown in Figure 6, the different velocities of scanning required in connection with lines 42 and 52, are readily obtained by the choice of suitable values of the capacitors and inductors employed to form the line. The source light previously referred to, which is furnished by a succession of flash tubes **50*a*, 50*b*, 50*c*, etc., produces traveling line of light which scans once vertically during each frame. The voltage applied to the flash tubes 50*a*, etc., is maintained constant by virtue of the proper value of the resistors 55*a*, 55*b*, etc. The value of these resistors decreases successively from the initial to the far end of the line, while the set of resistors at the other end of the tube 50, namely 56*a*, 56*b*, etc., may be maintained constant. All of the resistors 56 are connected to ground. The tube 50** may be of the flash tube variety or a photoflood speed light which may comprise, for example, a rare gas such as xenon or krypton. As previously stated, they may also be of the fluorescent light type containing a phosphor which can be flashed on and off, in a time approximating 100 micro-seconds.

At the start of the frame, pulser Y emits a pulse which causes the flash tubes **50*a*, 50*b*, . . . 50*k*, to be successively activated so that, for example, a line of light travels vertically in 1/30 of a second. During the interval in which flash tube 50*k*, for example, is illuminated, all other flash tubes are dark so that light is available for transmission through the screen only along the line 50*k*. At the instant that line 50*k* is illuminated, pulse 40 is emitted by X pulser 38 and travels along the line 42. When the pulse 40** has reached the *j*th strip, the shutter section immediately under the vertical line **30*j* is caused to operate. Consequently, only at the intersection of the line 30*j* and the flash tube 50*k* is a light pulse permitted to travel through the screen 29. This is the light which constitutes the elementary scanning area 57*jk*** at the intersection of the horizontal and vertical lines.

In addition to the pulse 40, there is the picture signal voltage 58, which constitutes the modulating voltage 40 scans along a horizontal line, the picture signal voltage 58 varies in accordance with the impressed signal modulation amplitude 33. In this manner, the entire screen area 29, shown in Figure 6 within the dashed lines, is scanned, and the elementary areas 57 are suitably intensity modulated to reproduce the picture being televised.

Referring to Figure 8, there is shown a circuit whereby the X and Y lines may be pulsed from the same pulser circuit. It will be noted in this connection that the X pulse has a duration equal to the length of time required to scan one elementary area in the X direction. This time is 1/10 to 1/4 micro-seconds. Such a pulse can be readily generated with the conventional type of radar pulsers. Pulser Y, however, must emit a pulse having a duration equal to the length of time required to scan a complete line in the X direction. This pulse is of the order of 90 micro-seconds. A single pulser which will serve for both the X and Y directions can be produced by the use of the so-called "hard tube" pulsers. The hard tube pulser circuit produces a pulse whose duration is controlled by the synchronizing or keying signals. Such hard tube pulser circuits may employ as switch tubes the hydrogen thyratron powered by a capacitor having a sufficiently large value to store energy for the longest pulse required.

In the present instance, since two different lines are pulsed in the manner above indicated, it will be necessary to employ two hydrogen thyratrons fed from a single storage capacitor of large value. The large storage condenser 59 is fed by the voltage source 60 through the isolating resistor 61. The hydrogen thyratron 62 is keyed through terminals 63 with a keying pulse 68 whose duration is equal to that of the output pulse 40. The grid of the tube 62 is maintained below cut-off by the biasing battery 64 through the isolating resistor 65. Capacitors 66 and 67 are utilized to transmit the keying pulse 68, at the same time isolating the elements of the tube 62 from the pulse 68. Similarly, hydrogen thyratron 69 is utilized to supply the pulse 70 to the line 71. The keying pulse 72 has a duration equal to that of the output pulse 70. The storage capacitor 59 thus supplies both circuits 71 and 73 with pulses of different duration and in the proper succession.

The operation of the screen shown in Figure 6 is dependent upon the non-linear characteristic of the optical shutter element. It was previously shown that in order to obtain a satisfactory contrast ratio, a 2 or 3 section shutter must be employed having a suitable non-linear characteristic such as is shown in Figure 5. It would be preferable, however, to employ a single section shutter thus making for simpler construction and greater light transmission.

In order to do this, a non-linear characteristic may be produced electrically. Specific examples of means to produce these characteristics are described in connection with Figures 9 and 10. It may be desirable to reduce the operating voltage of the single section shutter by employing the interleaved construction shown in Figure 4.

In both Figures 9 and 10, similar parts have been given the same numbers, as in Figure 6, except as hereinafter indicated.

Figures 9, 10:
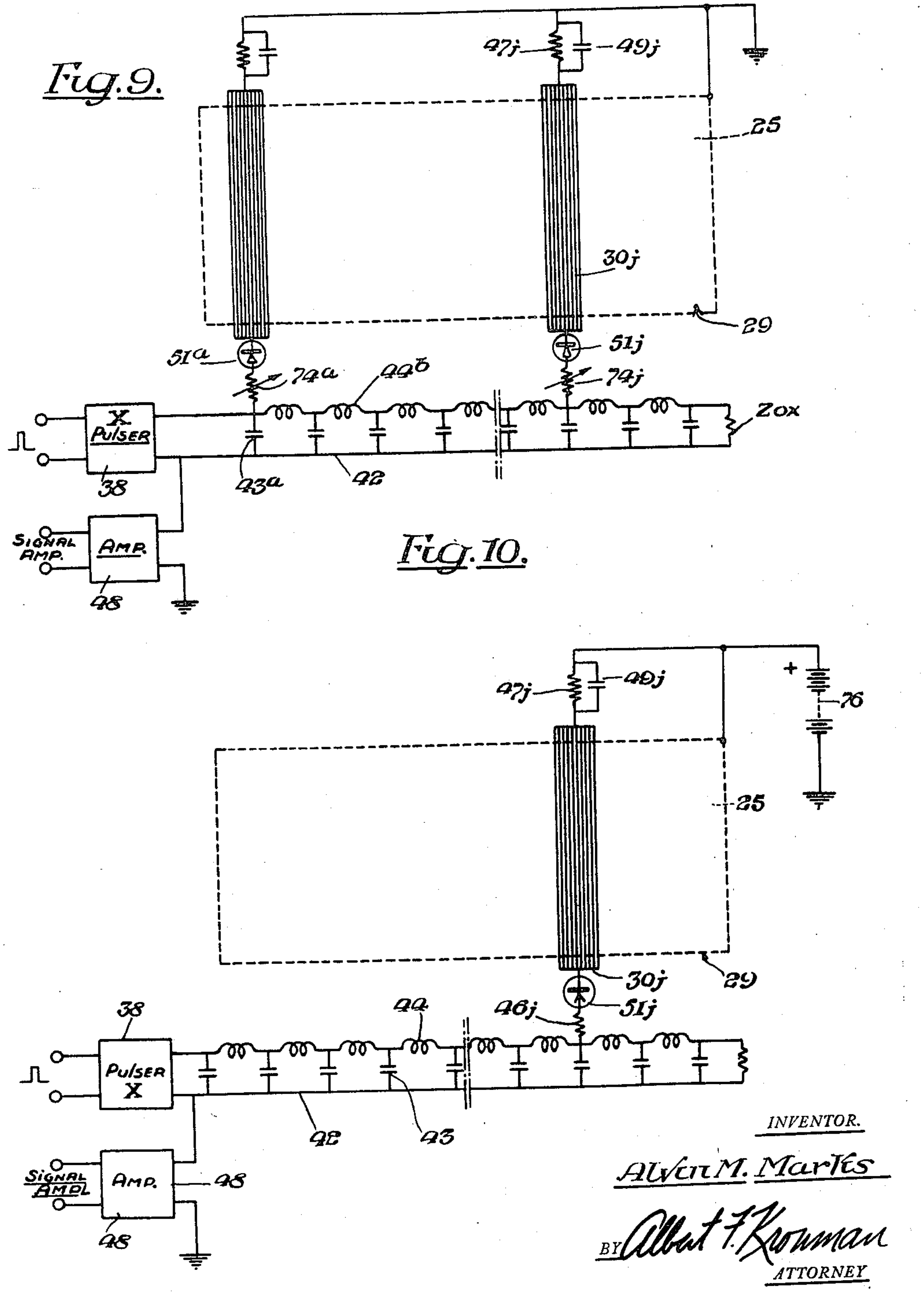
Figure 9 is a schematic view of a novel scanning and modulating circuit employing non-linear elements.
Figure 10 is a schematic view of a novel scanning and modulating circuit employing rectifier elements.

Referring to Figure 9, the element 74j is a thyrite non-linear resistor in the *j*th conducting strip along the screen 29. As an example, the characteristic of the thyrite resistor may be given by the formula:

$$i=Kv^n$$

where $K \doteq 1.1\times10^{-25}$
$n \doteq 6$

From this formula, it follows that a voltage across the resistor 74j must be greater than a certain critical voltage, of the order of the pulse voltage, for the resistance thereof to be less than substantially infinite.

When the voltage does not exceed the pulse voltage or the signal voltage, the current $i$ in the *j*th element is very small and the potential of the *j*th element relative to the common ground element 25 is low. As a result, the light shutter is substantially opaque. However, when a signal amplitude and a pulse voltage are simultaneously applied across the *j*th element, it causes a substantial voltage drop across the resistor 74j which now transmits considerable current, thereby increasing the potential of the *j*th element relative to the grounded element 25. The rapid drop in the resistance of 74j as the total of the signal and pulse voltages exceeds the critical voltage causes almost all the additional signal voltage to appear across the resistor 47j, and the condenser 49j. As before, when the pulse has traveled beyond the element 30j, the rectifier element 51j ceases to become conductive, and the voltage amplitude is momentarily retained by the condenser 49j until it leaks off through the resistor 47j. This action will occur within the length of time corresponding to that which is required to scan one line. After the pulse has passed beyond the strip 30j, the signal amplitude, which is still impressed across the said strip, is substantially taken up in voltage drop across the now high resistance 74j. Consequently, when the pulse is not at the *j*th element the signal amplitude present has relatively little effect in producing an operating voltage on the strip 30j and the light shutter between the strip 30j and the common electrode 25 is then substantially opaque.

In Figure 10 there is shown another method of scanning and modulating a screen 29. In this embodiment both the common screen element 25 and the *j*th element of the screen are ordinarily maintained at the positive bias of the voltage source 76. This positive bias may be of the order of the amplitude of the pulse voltage. The strip 30j is maintained at the same voltage as the common screen element 25, so that there is no potential difference between these two elements under ordinary circumstances. The rectifier 51j practically isolates the strip 30j from the pulser 38 and the signal amplifier 48 under ordinary circumstances.

However, when a combined voltage of the pulser 38 and the signal amplitude is applied, a signal appears momentarily across the *j*th element. The voltage on the terminal of the resistor 46j at this instant exceeds the voltage source 76. The rectifier 51j therefore becomes conductive and a current passes through the strip 30j. This current is proportional to the signal amplitude. Thereupon, the voltage drops, across the resistor 47j and the capacitor 49j, establish a potential difference E between the strip 30j and the common electrode 25 which is proportional to the signal amplitude present. However, after the pulse has passed beyond the strip 30j the voltage upon the rectifier 51j is that of the signal amplitude only, which is insufficient to overcome the positive bias of the rectifier element. It will thus be seen that the signal amplitude can only affect the *j*th strip momentarily, while the pulse is also being applied.

The effect of persistence, produced by the resistor 47j and the capacitor 49j, depends upon the signal voltage momentarily impressed thereon. The charge given to the capacitor 49j during the picture modulation then persists after the pulse has passed, since the voltage applied to the capacitor 49j is proportional to the signal voltage at that instance.

The previous discussion has shown how the novel scanning principles herein disclosed may be applied to actuate electro-optic shutters, particularly those employing the parallel electroc-optic effect.

Another form of screen according to this invention is shown schematically in Figure 11. A light reflecting surface 101 is positioned behind the screen proper. Immediately in front of the reflector 101 are a plurality of high intensity illuminants 102. These illuminants 102 are capable of substantially instantaneous variation in accordance with an intensity signal voltage $e_i$. Illuminants such as have been previously described in connection with Figures 6 and 7 are satisfactory for this purpose. The light from the illuminants 102 is converted into a uniform field by a diffusing plate 103 which is placed between the illuminants 102 and the screen 104. The diffused light emanating from the plate 103 is polarized by a suitable polarizing sheet 105 before it enters the screen 104.

The body of this form of screen is in the shape of a thin rectangular transparent tank 155. Within the tank 155 there may be contained a liquid 106. The liquid 106 contains suitable transparent birefringent elongated dipole particles 107. The length of these particles 107 is critical.

A maximum dipole particle length is desired to increase the dipole moment, to enable easy alignment by means of weak electric fields. The birefringent effect, moreover, is increased in the thicker and longer particles 107. On the other hand, the particle length must not exceed a given size, since the relaxation time must be sufficiently small to provide an adequate response to the control signals. Moreover, the width of the particles must not be great enough to cause substantial light scattering when the light is passing approximately parallel to the axis of the aligned particles 107.

Such requirements are met by colloidal suspensions of anisotropic, birefringent, elongated, dipole particles of substances which have an inherently large dipole moment. These colloidal particles may preferably be suspensions of crystallites in a suitable liquid. The crystallites, quartz, etc. In addition to colloidal suspensions of organic or inorganic chemical compounds; for example, meconic acid, quinine sulphate, certain protein crystallites, quartz, etc. In addition to collodial suspensions of transparent birefringent crystallite dipole particles, the liquid 106 may comprise a dilute solution, in any suitable solvent such as water, alcohol, etc. of a substance having an elongated molecular structure. This substance must also have a large electric dipole moment and a birefringent effect, when a plurality of its molecules are suitably aligned in an electric or magnetic field. Such substances include the class known to form "liquid crystals" in molten, or concentrated solution, and which may exist in the smectic or nematic state. An example of a substance belonging to the class of liquid crystals, is p-azoxyanisol. Many other such well known substances may be alternatively employed.

The front and rear inner surfaces of the screen 104 are latticed by a plurality of wires 108, 109, which comprise two distinct series of gratings. The rear grating 108 is formed of spaced vertical wires. The front grating 109 is formed of spaced horizontal wires. The wires which are formed into the gratings 108, 109 are small in diameter compared to the distance therebetween, and consequently will cause a minimum of interference with the passage of light through the screen 104. The cutaway section shown in Figure 11 is therefore exaggerated as to the relative size of the wires and width of the tank 155, for the purpose of clarity of illustration.

A polarizing sheet 110 is placed in front of the screen 104. The plane of polarization of the sheet 110 is at right angles to that of the opposed polarizer 103 located behind the screen 104. In this manner, all the light which enters the screen 104 from the illuminants 102 is ordinarily absorbed by the second of the cross-polarizers 110; hence the observer 111 sees only a dark screen. However, light passing through region 112 is rotated or depolarized, as hereinafter described, and is thus enabled to pass through the second polarizer 110. The intensity of the light passing through the region 112 is modulated by the intensity signal voltage $e_1$ applied to the bank of illuminants 102.

The scanning signals, which determine the coordinates (X, Y) for locating the given region of light 112, are fed into the electrical circuits connected to the gratings 108, 109. A preferred means by which this is accomplished is described below in connection with Figures 15 and 16, which show a frequency scanning means. Alternatively, the wires comprising the gratings 108, 109 may be connected to an array of contactors on a cathode ray or ion gun selector tube through appropriate vacuum tube circuits (not shown). Thus, in a small region 112, between the two gratings 108, 109, a region of zero electrical field is located, defined there by the X and Y scanning signals.

The above mentioned birefringent particles ordinarily may be aligned normal to the plane of the gratings 108, 109 by an electrical field 113 applied between the said gratings (see Figure 13). Under these conditions the polarized light 114 from the polarizer 105 (the plane of polarization of which may be at 45° to the horizontal) traverses a path approximately parallel to the long (optic) axis of the particles 107 axcept in passing through the region 112. Thus there will be no relative retardation between the horizontal and the vertical components, or depolarization of the polarized light 114 except in passing through the region 112.

However, since the electrical field may be zero within the region 112, which is located in the vicinity of the scanned X and Y coordinates, the particles 107 within the region will quickly become disoriented. Some of the disoriented birefringent particles will have the effect of randomly rotating the plane of polarization, and hence of depolarizing the light. The result of a rotation or depolarization of the divergent rays of light 114, in passing through region 112 is to enable a substantial portion of the rays 114 to pass through the second polarizer 110; whereas, other light rays 115 from elsewhere within the screen are blocked by the polarizer 110.

Thus, a modulated spot of light at region 112 will appear to be located at the intersection of the coordinates X and Y scan within the screen 104, said spot having the intensity of the corresponding element of light on the object being televised.

The three signal voltages impressed upon the control elements scan the screen 104 and also control the intensity of light emanating from each region of zero electrical potential within the confines of the screen, thereby organizing an image in two dimensions.

Figure 14 is generally similar to Figure 13, except that the region of zero field 112 is replaced by field 116, which may be either electric or magnetic. The field 116, is for example, directed horizontally and is parallel to the plane of the gratings 108, 109. The strength of the field 1 may be considerably less than that of the normal aligning electric field 113. The effect of this arrangement is the region of disorientation 112, referred to in connection with Figure 13, is replaced by a region 116*a* in which a secondary alignment of the particles 107 occur, as shown in Figure 14. The secondary alignment of the dipole birefringent particles 107 is such that they are aligned with their optic axes at 45° to the planes of polarization of the polarizers 105, 110, and parallel to the planes of gratings 108, 109. If the concentration of dipole particles 107 is such as to cause a quarter wave retardation between the vertical and horizontal components of the polarized light ray 114, the said rays will pass, in part through the polarizer 110. However, the components of rays 115, which are not relatively retarded, are absorbed by the polarizer 110, as shown in Figure 11.

Figure 16:
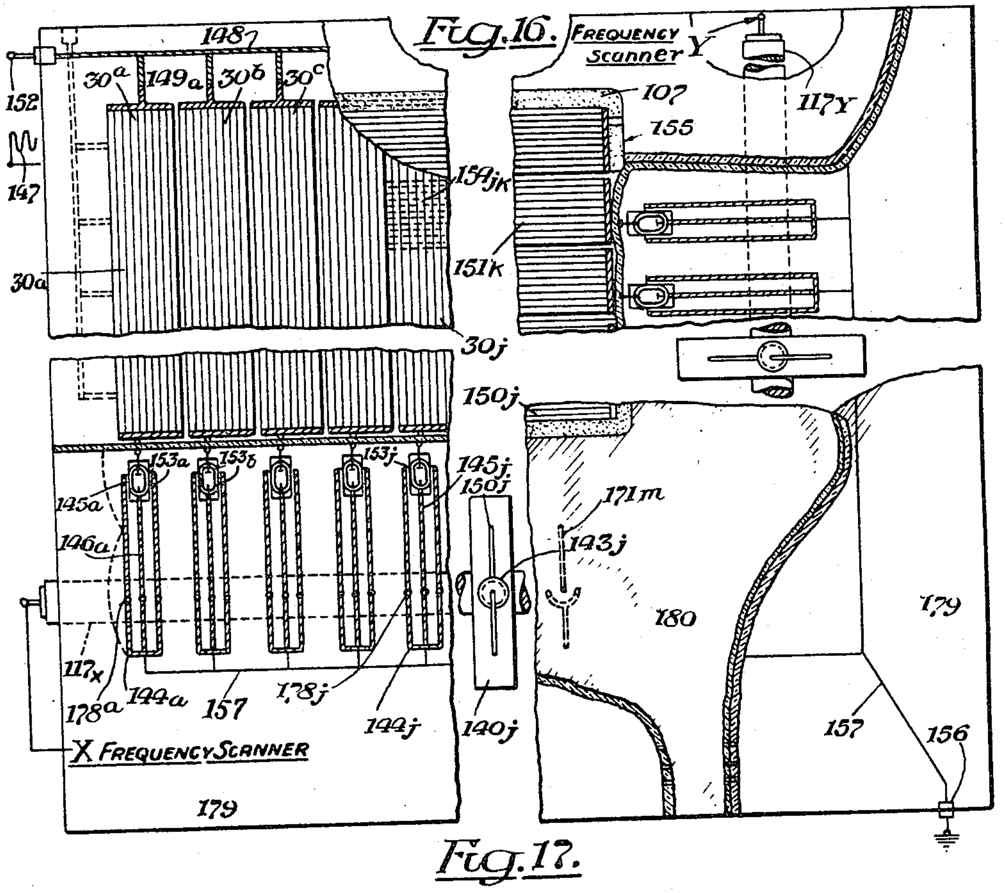
Figure 16 shows a fragmented view of a two-dimensional screen according to this invention with certain portions cut away to show the microwave control circuits thereon.

A preferred system of scanning the screen shown in Figure 11 is illustrated in Figures 15 and 16. This system, hereinafter referred to as frequency scanning, employs two saw-tooth frequency variations which are applied along the X and Y axes of the screen, respectively. Referring to Figure 15 there is shown a multiple resonator tube 117, which is derived from the klystron. This tube comprises the basis of the frequency scanning system. The oscillator section 118 of the multiple resonator tube 117 may be the conventional klystron type shown in Figure 16, employing two cavities 119 and 120 and a feedback coaxial line 121. An electron beam 122 proceeds from the cathode 123 under the influence of the electric field between the anode 124 and the cathode 123. Electron beam 122 is bunched as at 125 in the well known manner by the high frequency field between the grids 126, 127 of the cavity 119, as it travels through the drift space 128. The electron beam 122 traveling through the drift space 128 arrives 180° out of phase at the grids 129, 130 out of the cavity 119, and thereby sustains the oscillations by supplying power to the high frequency field in the cavities 118 and 119. Thus there arrives at the entrance 131 to the multiple resonator tube 177 a bunched electron beam 125, which periodically varies in electron density, as indicated by the group of dots shown in Figure 15.

In order to modulate the frequency, certain factors may be varied such as, beam current, acceleration voltage or output load. A preferred means of modulating the frequency by varying the current of the electron beam 122, is shown in Figure 15. This variation is accomplished by means of an auxiliary saw-tooth voltage 132 supplied at terminals 133 by the scan sweep generator 134. This voltage is applied through capacitor 135 to the cathode 123 and to the collector-anode 136 through the capacitor 137. Isolating resistors are shown at 138 and 139. In this manner the electron density of the electron bunches may be periodically varied so that the time frequency graph possesses a saw-tooth variation.

A plurality of cavities 140a and 140b, etc., are arranged along the multiple resonator tube 117. The cavity 140j, shown in Figure 15, is hereinafter referred to particularly. This cavity 140j has a radius *aj*, and grids 141j and 142j. It is well known that cavities of this type possess an extremely high "Q"; i.e., are very sharply tuned to a precise wave length. One dominant resonant node may be expressed by the formula $\lambda j = 2.61\ aj$, where *aj* is the radius of the cavity in centimeters of the *j*th cavity and $\lambda j$ is the wave length in centimeters.

Since the "Q" may be of the order of 10,000 to 30,000, a very small change in radius is sufficient to detune the cavity. Accordingly, the multiple resonator tube 117, shown in Figure 15, comprises a series of cavities 140a, 140b, etc., the radius of which may increase gradually from the front to the rear of the tube 117. This construction operates to produce a series of individually tuned cavities each of which is sharply tuned to a slightly longer wave length than the one preceding it. This wave length variation is preferably linear. Thus, as the frequency with which the electron bunches 125 pass a given point in linearly increased by the applied saw-tooth voltage 132, the cavities 140a, 140b, etc. are successively caused to resonate along the multiple resonator tube 117.

The cavity 140j, referred to specifically above, has the output coaxial line 143j which carries the high frequency energy produced within the said cavity. The high frequency energy thus produced is led from the cavity 140j to its particular portion of the grid within the screen. In this manner the resonating element is employed to energize a coordinate element of the said screen or deenergize it at a particular instant in the scanning operation. The energy may be fed successively from the cavities 140a, 140b, etc. directly along the coaxial lines 143a, 143b, etc., to the screen 104.

The means has now been provided for converting a saw-tooth frequency variation into a device for scanning along a space coordinate. It follows, therefore, that by providing two systems such as are shown in Figure 16, a two-dimensional area may be scanned, and any element of area therein instantaneously located. Appropriate saw-tooth frequency variation must be applied in synchronization to systematically scan in two dimensions.

Referring to Figure 16, there is shown a front view cut-away section of the frequency scanning device as applied to the actuation of the vertical strip electrodes 30a, 30b, 30c, . . . 30j, through the agency of the X frequency scanner and the multi-resonator tube 117X. Also similar actuation means for the horizontal strip electrodes 151a, 151b, . . . 151k, are shown for the Y frequency scanner 117Y. The portion of the screen comprising the shallow, rectangular tank 155, containing the dipoles 107 is also shown, the dipoles 107 being indicated as dots around the extremities of the tank 155 in the cutaway section.

The coaxial feeder line 143j is shown terminating in the dipole antennae 150j. Antennae 150a, 150b, . . . 150j, are arranged in close proximity to the rear of the screen 104, closely adjacent corresponding antennae 171j, which pick up energy radiated from the said antennae 150, and transmit said energy through a three wire micro-wave circuit 172, 173, 174, terminating at the quarter-wave point 178 of the three-quarter wave lines 144 inscribed on the front face 179 of the screen.

In Figure 12 there is shown a dipole termination 171 for a three wire micro-wave line. This dipole 171 may be inscribed into the surface of an insulating medium such as polystyrene or glass. The three wire line, 172, 173, being the outer wires thereof, and 174 the central wire, is shown communicating with the dipole 171 through the glass sheet 180 normal to the face thereof. The outer wires 172, 173, of the three wire micro-wave line, are joined by the inscribed connecting strip 177 which also joins with the lower portion of the dipole antenna 176. The upper portion 175 of the dipole antenna 171 connects with the central wire 174 of the micro-wave three wire line. The dipole 171 is placed in the near zone in close proximity to the corresponding dipole 150 and so picks up a substantial amount of energy only from the said dipole. Where necessary, additional shielding can be employed to prevent energy leakage to adjacent dipole systems. The advantage of the system shown is that numerous dipoles such as 171 can be inscribed or printed on a flat surface and are thus affixed permanently. Also, the necessity for a multitude of connections, between the multiple resonator tube and the screen elements, is avoided by the plurality of space couplings provided by the corresponding antennae 150 and 175.

The three-quarter wave lines 144a, 144b, . . . 144k, generate standing waves 146a, 146b, etc., in response to the micro-wave energy applied at the quarter wave point 178. The effect of this is to cause a maximum voltage to appear across the open ends of the lines 145a, 145b, . . . 145j, and at the same time to cause nodes of zero voltage to be present at the closed end of the line 144a. Since zero voltage exists across the closed ends of the three-quarter wave lines 144, all of these may be connected as shown and grounded at 156 by means of the common connecting wire 157.

The operation to this point may be understood by reference to Figure 15, considering that the saw-tooth voltage 132 is increasing linearly, and the micro-wave excitation proceeds from cavity 140a to cavity 140b; eventually reaching cavity 140j and then passing finally to cavity 140n. The micro-wave energy momentarily being produced at the cavity 140j, is piped through the coaxial line 143j and radiated from the antennae 150j; this radiation being picked up by the closely adjacent antennae 150j; inscribed on the back plate of the screen 104. This screen is thus caused to excite the three-quarter wave line 144j, and thus activates a high frequency electric field with a maximum voltage across the open end of line 145j. Thus, in succession, a high frequency voltage appears momentarily at the open end of lines 145a; then 145b, and eventually at 145j, which has been described as momentarily under excitation.

The following description is directed to the means by which the micro-wave energy thus appearing across the open end of the three-quarter wave lines 144 is caused to change the potential of the electrode strips 30a, 30b, . . . 30j. All of the said electrode strip 30 (Figure 16) are connected through resistors 149a, 149b, . . . 149j, to the common lead 148, terminating in contact 152. To the contact 152 is applied the pulsating D.C. voltage 147. The frequency of the pulsating voltage 147 is somewhat greater than the reciprocal of the time required to scan one vertical element 30. The strips 30 are connected in series with the diodes 153a, 153b, . . . 153j. The diodes 153 ordinarily have a high resistance. However, upon said diodes 153 being subjected to the high frequency electric field 147, said diodes 153 are caused to ionize and will thereupon readily transmit, offering a relatively low resistance to the passage of the electric current, so long as the voltage across said diodes 153 is maintained. However, since we have a pulsating voltage 147, the diodes 153 are periodically extinguished.

It follows, therefore, that as the micro-wave excitations travel from the three-quarter wave line 144a to the three-quarter wave line 144b, etc., they simultaneously cause conductive breakdown to occur in diode 153a, then in diode 153b, etc. Since the resistance 149a, for example, may be 10,000 ohms, and the resistance of diode 153b may be 10 megohms when non-conducting, and only 500 ohms when conducting, it may be seen that the electrode strip 30a may be maintained at a high potential at all times except when the diode 153a is conducting, at which time the said electrode strip 30a will be practically at ground potential.

Summarizing, then, the saw-tooth voltage 132 (of Figure 15) causes a micro-wave excitation to successively cause breakdown in the diodes 153. The electrical breakdown of the diodes 153 in turn causes a substantially zero potential to travel from electrode strip 30*a* to electrode strip 30*b*, etc., to 30*k* along the screen. In a similar manner the Y frequency scanner 172 causes the zero potential to sweep vertically from strip 151*a* to 151*b*, etc., to 151*k*.

It will thus be seen that at elementary area 154*j*, *k*, corresponding to the crossing point of the strips 151*k*, which is at zero potential momentarily; and strip 30*j* which is also at zero potential momentarily; and only at 154*j*, *k* will there be an elementary area having zero potential. All other elementary areas at other crossing points will be at either half or full potential difference.

Thus, only at 154*j*, *k* will substantial disorientation of the particles 107 occur, and only at 154*j*, *k* will substantial light transmission momentarily occur. In this manner the screen is scanned through the agency of X and Y micro-wave frequency scanners 117X, 117Y. Simultaneously with said scanning the background light is modulated, as above described to paint upon the screen a televised image.

Figure 17:
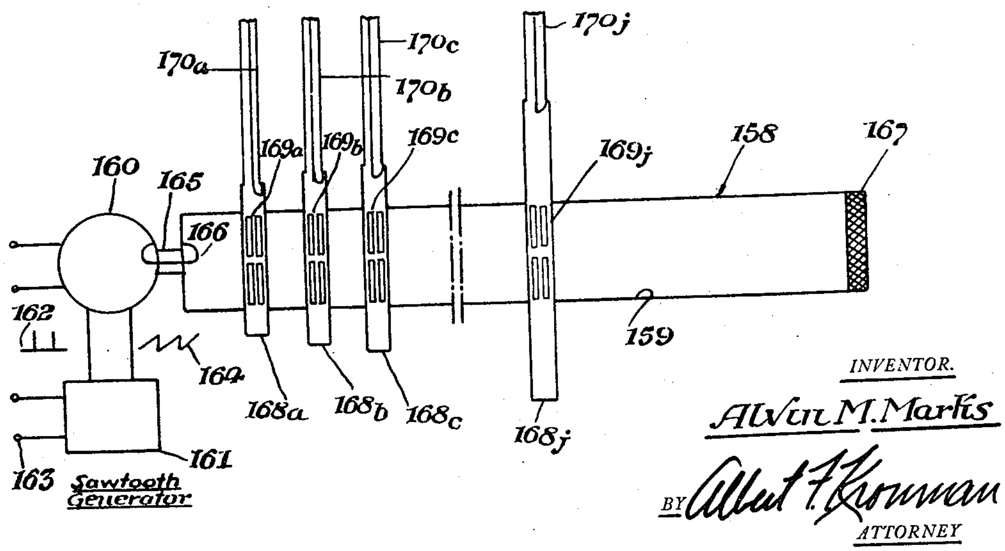
Figure 17 shows a section through a variable frequency microwave resonator tube, to be used in lieu of the variable frequency scanner of Figure 15.

Referring to Figure 17, there is shown another type of multi-resonator frequency scanner. This scanner comprises a multiple resonator tube 158, actuated by a wave guide 159. The micro-wave energy is generated by a variable frequency micro-wave source 160, such as a magnetron or klystron micro-wave generator, which is controlled by a saw-tooth generator 161. The saw-tooth generator 161 is controlled by the synchronizing signals 162 to terminals 163. The effect of the saw-tooth output 164 applied to the micro-wave generator 160 is to periodically increase the frequency of the micro-waves generated thereby, in accordance with the saw-tooth wave 164. The saw-tooth variable frequency micro-wave output of the micro-wave generator 160 is piped through the coaxial cable 165 which is terminated in the loop 166. The loop 166 couples the energy into the wave guide 159. Microwave energy thus travels down the wave guide 159 which is terminated in its characteristic resistance 167 which fully absorbs the micro-wave energy reaching the end of the line, thus preventing reflections and standing waves from being set up within the wave guide 159.

The wave guide 159 actually comprises a stack of resonant cavities 168*a*, 168*b*, . . . 168*j*, etc., with their axes coinciding with the long axis of the wave guide 159. The cavities 168*a*, 168*b*, etc. may be arranged external to the wave guide 159, with a communication between the wave guide and the cavity by means of perforations 169*a*, 169*b*, etc., in the walls of the said wave guide 159, to admit leakage micro-wave energy from the wave guide 159 to the said cavities 168.

The manner of operation of this scanning device will be understood with reference to the prior description of the multiple resonator tube shown in Figures 15 and 16; it being emphasized that in the present case variable frequency micro-waves 164 are externally produced and piped to all of the cavity elements simultaneously, with only that cavity, which is tuned to the frequency momentarily being generated, absorptively responsive to the said energy. Since the frequency varies in a saw-tooth manner, the cavities 168*a*, 168*b*, etc. will be excited in succession and thus produce a linear displacement of absorbed energy, which is piped along the feeder lines 170*a*, 180*b*, . . . 170*j*, etc. to electro-optic responsive elements on the screen in the previously described manner.

Having thus fully described the invention, what is claimed as new and desired to be secured by Letters Patent of the United States is:

1. An apparatus for producing two-dimensional television images comprising, a light source, spaced crossed polarizing sheets in front of said light source, a plate of electrooptic responsive material disposed between and substantially parallel to said sheets, said electrooptic responsive means adapted to rotate the plane of polarization of light transmitted by the said polarizing sheets in response to the magnitude of an electrical field applied across the electro-optic responsive plate, a plurality of parallel first conductors mounted adjacent to one side of said electro-optic responsive plate, a plurality of parallel second conductors mounted adjacent to the other side of said plate, said first and second conductors disposed at substantially right angles to each other, a first voltage delay means coupled to said first conductors to successively apply voltage to the first conductors, a second voltage delay means coupled to said second conductors to successively apply voltage to the second conductors, a first and second source of periodic electrical signals connected to each of said delay means respectively, to apply voltages successively to the conductors to scan the plate, and a source of picture modulated electrical signals connected in series with one of said delay means, said signals being applied to said delay means for controlling the amount of light transmitted through said electro-optic means to produce a two-dimensional image responsive within the electro-optic sheet.

2. An apparatus for producing two-dimensional television images comprising, a high intensity light source composed of a plurality of flash tubes, spaced crossed polarizing sheets in front of said light source, a plate of electro-optic responsive material disposed between and substantially parallel to said sheets, said electro-optic responsive means adapted to rotate the plane of polarization of light transmitted by the said polarizing sheets in response to the magnitude of an electrical field applied across the electro-optic responsive plate, a plurality of parallel first conductors mounted adjacent to one side of said electro-optic responsive plate, a plurality of parallel second conductors mounted adjacent to the other side of said plate, said first and second conductors disposed at substantially right angles to each other, a first voltage delay means coupled to said first conductors to successively apply voltage to the first conductors, a second voltage delay means coupled to said second conductors to successively apply voltage to the second conductors, a first and second source of periodic electrical signals connected to each of said relay means respectively, to apply voltages successively to the conductors to scan the plate, and a source of picture modulated electrical signals connected in series with one of said delay means, said signals being applied to said delay means for controlling the amount of light transmitted through said electro-optic means to produce a two-dimensional image responsive within the electro-optic sheet.

3. An apparatus for producing two-dimensional television images comprising, a light source, spaced crossed polarizing sheets in front of said light source, a plate of electro-optic responsive material disposed between and substantially parallel to said sheets, said electro-optic responsive means comprising a birefringent crystalline body and adapted to rotate the plane of polarization of light transmitted by the said polarizing sheets in response to the magnitude of an electrical field applied across the electro-optic responsive plate, a plurality of parallel first conductors mounted adjacent to one side of said electro-optic responsive plate, a plurality of parallel second conductors mounted adjacent to the other side of said plate, said first and second conductors disposed at substantially right angles to each other, a first voltage delay means coupled to said first conductors to successively apply voltage to the first conductors, a second voltage delay means coupled to said second conductors to successively apply voltage to the second conductors, a first and second source of periodic electrical signals connected to each of said delay means respectively, to apply voltages successively to the conductors to scan the plate, and a source of picture modulated electrical signals connected in series with one of said delay means, said signals being applied to said delay means for controlling the amount of light transmitted through said electro-optic means to produce a two-dimensional image responsive within the electro-optic sheet.

4. An apparatus for producing two-dimensional television images in accordance with claim 3 wherein said crystalline body is ammonium dihydrogen phosphate.

5. An apparatus for producing two-dimensional television images in accordance with claim 2 wherein said electro-optic responsive means is a suspension of electrically responsive birefringent crystalline bodies.

6. A device in accordance with claim 3 in which the first and second conductors are formed of a transparent material.

7. A device in accordance with claim 3 in which at least one of said delay means includes an electrical delay line having shunt capacitors and series inductors.

8. A device in accordance with claim 3 in which at least one of said delay means includes a micro-wave multi-resonator discharge device.

9. A device in accordance with claim 3 in which at least one of said delay means includes a micro-wave multi-resonator discharge device energized by the power from a saw-tooth wave generator.

10. A device in accordance with claim 3 in which the coupling means between the delay means and said conductors includes a non-linear circuit element.

11. A device in accordance with claim 3 in which the delay means is actuated by the output from a pulse generator.

12. Apparatus according to claim 1 in which at least one of the electrical delay means comprises a multi-resonator tube having a plurality of spaced resonant cavities adjacent the electron beam within said tube, said cavities being coupled to specific conductors of the electro-optic responsive means and responsive to a series of electron pulses having different velocities.

13. Apparatus according to claim 1 in which at least one of the electrical delay means comprises a variable frequency micro-wave generator coupled to a slotted wave guide, resonant chambers adjacent the slots of said guide connected to specific conductors of the electro-optic responsive means, said conductors being responsive to different micro-waves having different frequencies transmitted through said wave guide.

14. Apparatus according to claim 1 in which at least one of the electrical delay means comprises a variable frequency micro-wave generator coupled to a slotted wave guide and resonant chambers adjacent the slots of said guide, a plurality of dipole elements permanently disposed adjacent the wave guide and connected to specific conductors of the electro-optic responsive means, said conductors being responsive to different micro-waves having different frequencies transmitted through said wave guide.

References Cited in the file of this patent

UNITED STATES PATENTS

| | | |
|---|---|---|
| 2,013,559 | Gordon | Sept. 3, 1935 |
| 2,201,066 | Toulon | May 14, 1940 |
| 2,213,060 | Toulon | Aug. 27, 1940 |
| 2,471,253 | Toulon | May 24, 1949 |

FOREIGN PATENTS

| | | |
|---|---|---|
| 48,431 | France | Feb. 3, 1938 |
| 454,589 | Great Britain | Oct. 5, 1936 |